April 19, 1927.
N. R. FULKERSON
CAKE PAN
Filed Aug. 7, 1925
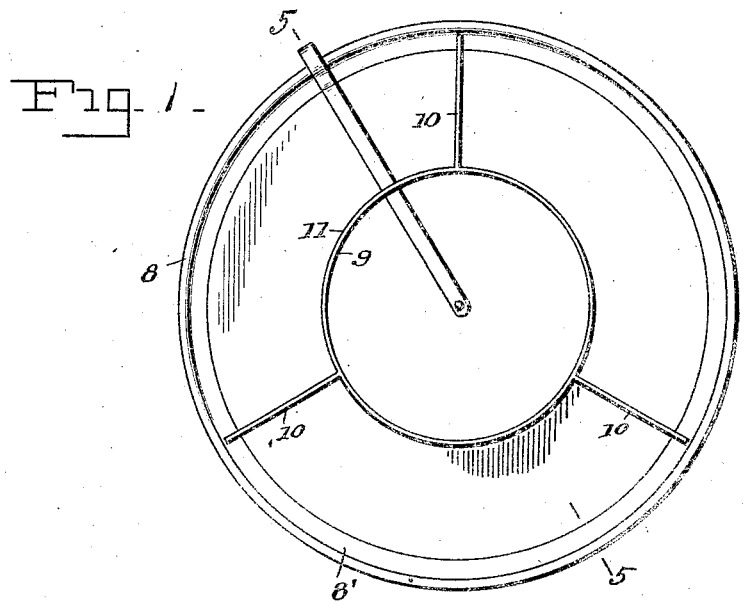
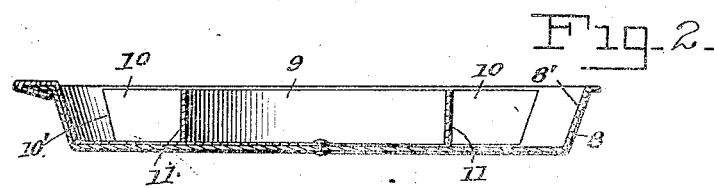
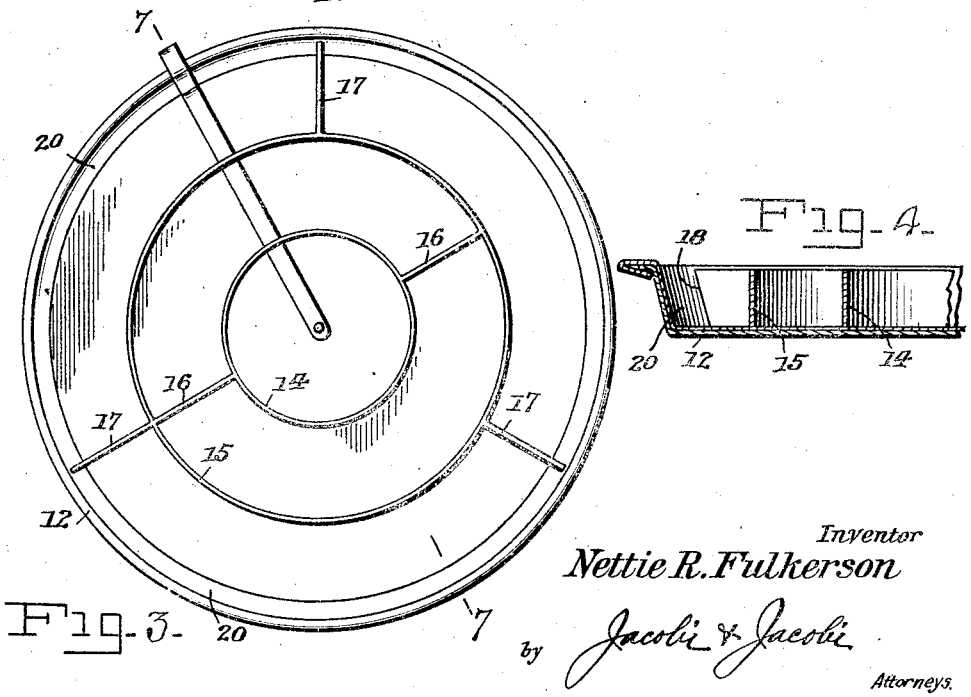
Inventor
*Nettie R. Fulkerson*
by *Jacobi & Jacobi*
Attorneys.

Patented Apr. 19, 1927.

1,624,941

UNITED STATES PATENT OFFICE.

NETTIE R. FULKERSON, OF FALLON, NEVADA.

CAKE PAN.

Application filed August 7, 1925. Serial No. 48,819.

My invention relates to new and useful improvements in cake pans and more particularly to an attachment for a cake pan whereby a cake may be produced effecting various different flavor and color combinations.

A further object of the invention resides in providing a removable and insertable attachment for a pan through the medium of which compartments are formed in said pan for the reception of cake batter of different colors and flavors, the attachment being adapted for removal prior to baking.

A still further object resides in providing a device which is simple and durable in construction, inexpensive to manufacture, and one which will be very efficient and useful in operation.

With these and other objects in view, my invention consists in the novel features of construction, combination and arrangement of parts, as will be hereinafter referred to and more particularly pointed out in the specification and claim.

In the accompanying drawings, forming a part of this application,—

Figure 1 is a top plan view of a circular pan fitted with my detachable improvement;

Figure 2 is a section on the line 2—2 of Fig. 1;

Figure 3 is a modification showing a different type of cake pan device; and

Figure 4 is a section on line 4—4 of Fig. 3 with parts broken away.

In Figs. 1 and 2 a circular cake pan 8 is provided. In this form a division member is provided consisting of a central circular partition wall 9 from the outer peripheral face of which radiate a plurality of division ribs or flanges 10. These flanges or ribs extend to the inner face of the peripheral wall 8' of the cake pan 8 and the outer edges of said ribs or flanges are beveled, as shown at 10' coincident to the inclination of this peripheral wall, as clearly shown in Fig. 2 of the drawings. This division member is adapted to fit snugly within the cake pan and obviously provides a plurality of compartments into which cake batter of various colors and flavors may be introduced. This division member, as in the other form of the invention described, is adapted to be removed from the pan prior to baking.

A further modification of the invention is illustrated in Figs. 3 and 4 in which a large circular cake pan 12 is shown for use particularly in the making of what is known as a "checkerboard" cake. In this form of the invention, I provide a division member comprising an inner circular partition 14 and an outer concentric circular partition 15, said partitions being held in spaced relation by means of the radial ribs 16 connecting the same, said ribs also providing compartments between said circular partitions. Projecting radially from the outer periphery of the outer circular partition 15 are the ribs or flanges 17, the outer end edges 18 of which are beveled coincident to the inclination of the inner face of the wall 20 of the pan 12, as clearly shown in Fig. 4. This division member is adapted to be inserted in the cake pan prior to the introduction of the cake batter into the various compartments, and is further adapted to be removed from the pan prior to baking as in the other form.

It will be readily seen that each partition offers opportunity to use a different color combination and wonderful effects can be secured by having three colors, one in each of the three circular spaces. Additional colors may be used between the additional partitions dividing the circular partitions.

From the foregoing description of the construction of my improved device, it will be seen that I have provided a simple, inexpensive and efficient means for carrying out the objects of my invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:—

In combination with a bake pan having an upstanding circular wall, a removable division member comprising a plurality of partition walls some of which are circular and concentrically arranged and others of which are radially disposed, said division member adapted to nest in the pan and the radial walls thereof having their outer end edges spaced from the inner surface of the side walls of the pan when the circular partition walls are concentrically arranged with relation to the pan.

In testimony whereof I affix my signature.

NETTIE R. FULKERSON.